(12) United States Patent
Thistleton

(10) Patent No.: US 6,571,900 B2
(45) Date of Patent: Jun. 3, 2003

(54) ARRANGEMENT FOR PERMITTING VEHICLE FOOT PEDAL RETRACTION AND VEHICLE INCORPORATING SAME

(75) Inventor: John Thistleton, NR Lincoln (GB)

(73) Assignee: BCK Technology Limited (GB)

( * ) Notice: Subject to any disclaimer, the term of this patent is extended or adjusted under 35 U.S.C. 154(b) by 0 days.

(21) Appl. No.: 09/809,656

(22) Filed: Mar. 15, 2001

(65) Prior Publication Data
US 2001/0027889 A1 Oct. 11, 2001

(30) Foreign Application Priority Data
Mar. 17, 2000 (GB) ............................................. 0006365

(51) Int. Cl.$^7$ ................................................. B60T 7/22
(52) U.S. Cl. ........................................ 180/274; 74/512
(58) Field of Search ............................. 180/274, 275; 280/784; 74/512

(56) References Cited

U.S. PATENT DOCUMENTS

| | | | | |
|---|---|---|---|---|
| 4,658,660 A | * | 4/1987 | Parker .................... | 248/222.51 |
| 5,921,144 A | * | 7/1999 | Williams et al. ............ | 180/271 |
| 6,070,488 A | * | 6/2000 | Yabusaki et al. ........... | 180/274 |
| 6,101,894 A | * | 8/2000 | Tiemann et al. ............... | 74/512 |
| 6,112,616 A | * | 9/2000 | Schonlau et al. ........... | 180/274 |
| 6,151,986 A | * | 11/2000 | Willemsen et al. ......... | 180/320 |
| 6,176,340 B1 | * | 1/2001 | Mizuma et al. ............. | 180/274 |
| 6,178,846 B1 | * | 1/2001 | Specht et al. ............... | 180/274 |
| 6,279,417 B1 | * | 8/2001 | Mizuma et al. ............. | 180/274 |
| 6,327,930 B1 | * | 12/2001 | Ono et al. ................... | 188/377 |

FOREIGN PATENT DOCUMENTS

| | | | | |
|---|---|---|---|---|
| JP | 198776 | * | 7/1999 | .................. 74/512 |
| JP | 255414 | * | 9/2000 | .................. 74/512 |
| JP | 280874 | * | 10/2000 | .................. 74/512 |

\* cited by examiner

Primary Examiner—Paul N. Dickson
Assistant Examiner—Toan C To
(74) Attorney, Agent, or Firm—Trexler, Bushnell, Giangiorgi, Blackstone & Marr, Ltd.

(57) ABSTRACT

An arrangement is provided for permitting retraction of a vehicle foot pedal, operable on a push rod, in a frontal crash of sufficient magnitude. The push rod is of low ductability material, having a zone of weakness. A rotary member is attached to, and mounted on the blade for free rotation about a pivot, by which rotary member the blade is operably coupled to the push rod; and an activation arm is provided to cause partial rotation of the rotary member upon a frontal impact of sufficient magnitude, to apply a bending moment to the push rod to snap the push rod at its zone of weakness. This disconnects the push rod from the blade permitting free blade/pedal movement, and hence permitting retraction of the foot pedal away from the feet of the driver.

5 Claims, 4 Drawing Sheets

ARRANGEMENT FOR PERMITTING VEHICLE FOOT PEDAL RETRACTION AND VEHICLE INCORPORATING SAME

FIELD OF THE INVENTION

This invention relates in a first aspect to an arrangement for permitting retraction of the foot pedal of a vehicle away from the driver in a crash situation, and whilst the device would normally be effective on the brake pedal the principles described could be applied to any other pedals (clutch pedal and the accelerator pedal), and in a second aspect to a vehicle incorporating such device.

BACKGROUND OF THE INVENTION

Some proposals for such devices operate on the principle of displacing the pivot axes of the brake pedal, cf GB 2279625, EP 0757946, EP 0788931. Other proposals release the pedal pivot from, its support cf EP 085079. Yet other proposals are described in EP 0810124, EP 0827885, EP 0836968. In WO 97/06036, is described a proposal for bending the booster push rod to permit pedal retraction, but with whatever system or device is employed, a vital requirement is that the device can never interfere with the normal operation of the braking system.

OBJECT OF THE INVENTION

A basic object of the invention is the provision of an improved arrangement for permitting vehicle foot pedal retraction, and a vehicle incorporating same.

SUMMARY OF A FIRST ASPECT OF THE INVENTION

According to a first aspect of the present invention there is provided an arrangement for permitting retraction of a vehicle foot pedal, operable on a push rod, in a frontal crash of sufficient magnitude characterized in that:

(i) the push rod is of low ductability material, having a zone of weakness;

(ii) a rotary member is attached to, and mounted on a blade of the pedal for free rotation about the pivot, by which rotary member the pedal is operationally coupled to the push rod; and (iii) displacement means is provided to cause partial rotation of the rotary member upon a frontal impact of sufficient magnitude, to apply a bending moment to the push rod to snap the push rod at its zone of weakness, thereby disconnecting the push rod from the pedal to permit free pedal movement and hence to permit pedal retraction away from the feet of the driver.

SUMMARY OF A SECOND ASPECT OF THE INVENTION

According to a second aspect of the invention, there is provided a motor vehicle comprising an arrangement in accordance with the first aspect.

ADVANTAGE(S) OF THE INVENTION

As the push rod is of relatively short length and is, in service, subjected only to compressive loadings there is no operational disadvantage in it being produced in a low grade, low ductability, material satisfactory for the intended duty. Consequently, when a relatively low level bending moment is applied to the push rod by the rotary member, the push rod readily snaps at its zone of weakness, and fracture of the push rod instantly de-couples the latter from the foot pedal, thereby freeing the foot pedal from the constraint on movement in the retraction direction away from the driver that is otherwise present due to the connections to the push rod, thereby permitting the pedal to be retracted, by rotation about its conventional pivot, away from the feet etc of the driver.

PREFERRED OR OPTIONAL FEATURES

The push rod comprises a main length of a first diameter, and an integral, second length of reduced diameter, with the zone of weakness provided at the transition between the two diameters.

Both the main length, and the second length, are of circular section.

The rotary member has a through hole through which the reduced diameter length of the push rod may pass.

The through hole of the rotary member is a circular hole.

In a first embodiment, the rotary member is rotated, by positional displacement of a component mass (such as a front engine/transmission package that, in a frontal crash situation of sufficient magnitude is subject to relatively rearwards movement of sufficient distance.

In a second embodiment, the rotary member is rotated, in a frontal crash situation of sufficient magnitude, as a result of a component engaging the conventionally provided cross-vehicle beam.

BRIEF DESCRIPTION OF THE DRAWINGS

One embodiment of an arrangement for permitting vehicle foot pedal retraction is shown in the accompanying drawings, in which.

DETAILED DESCRIPTION OF THE DRAWINGS

Figure 1:
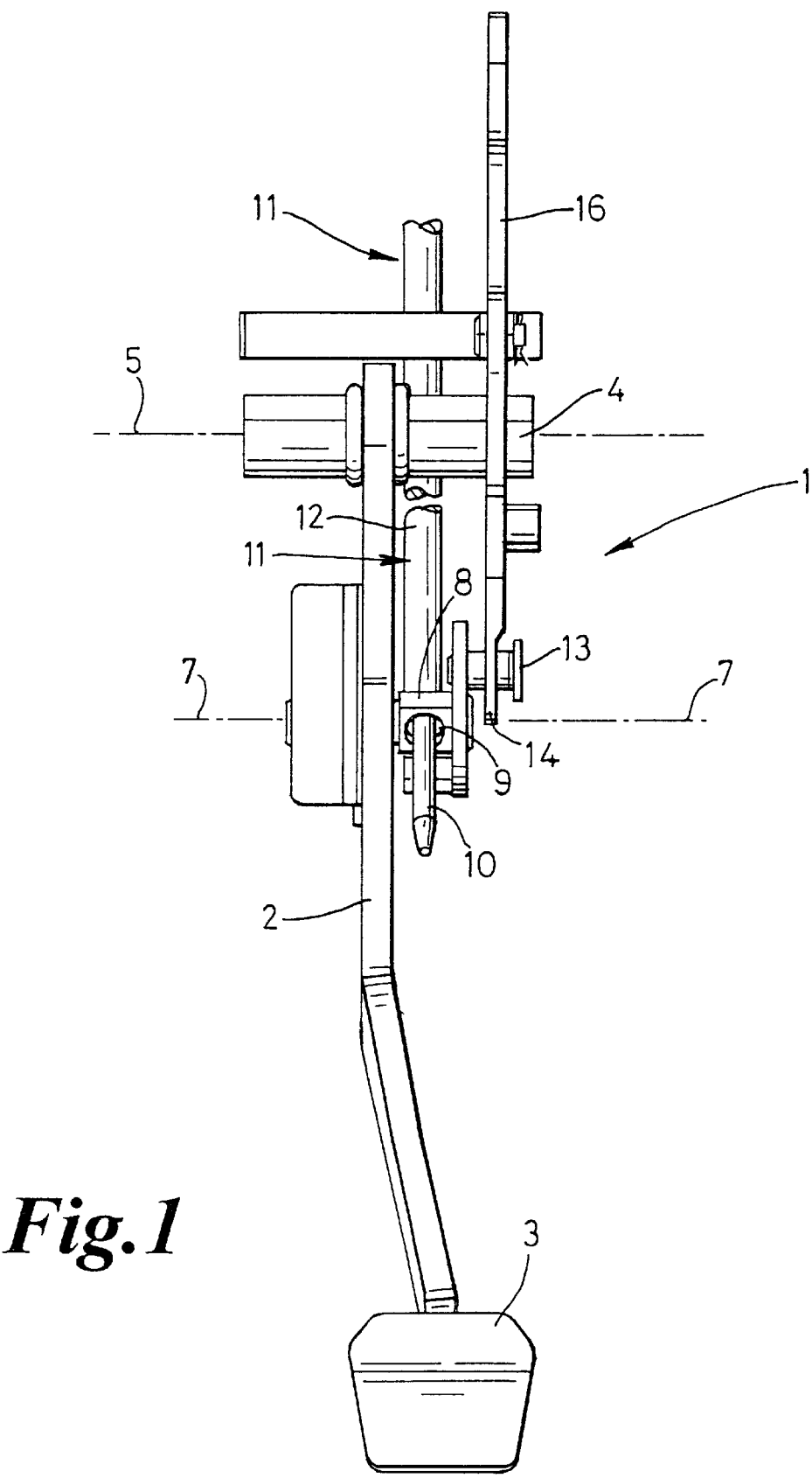
FIG. 1 is a front elevation.
Figures 2, 2A:
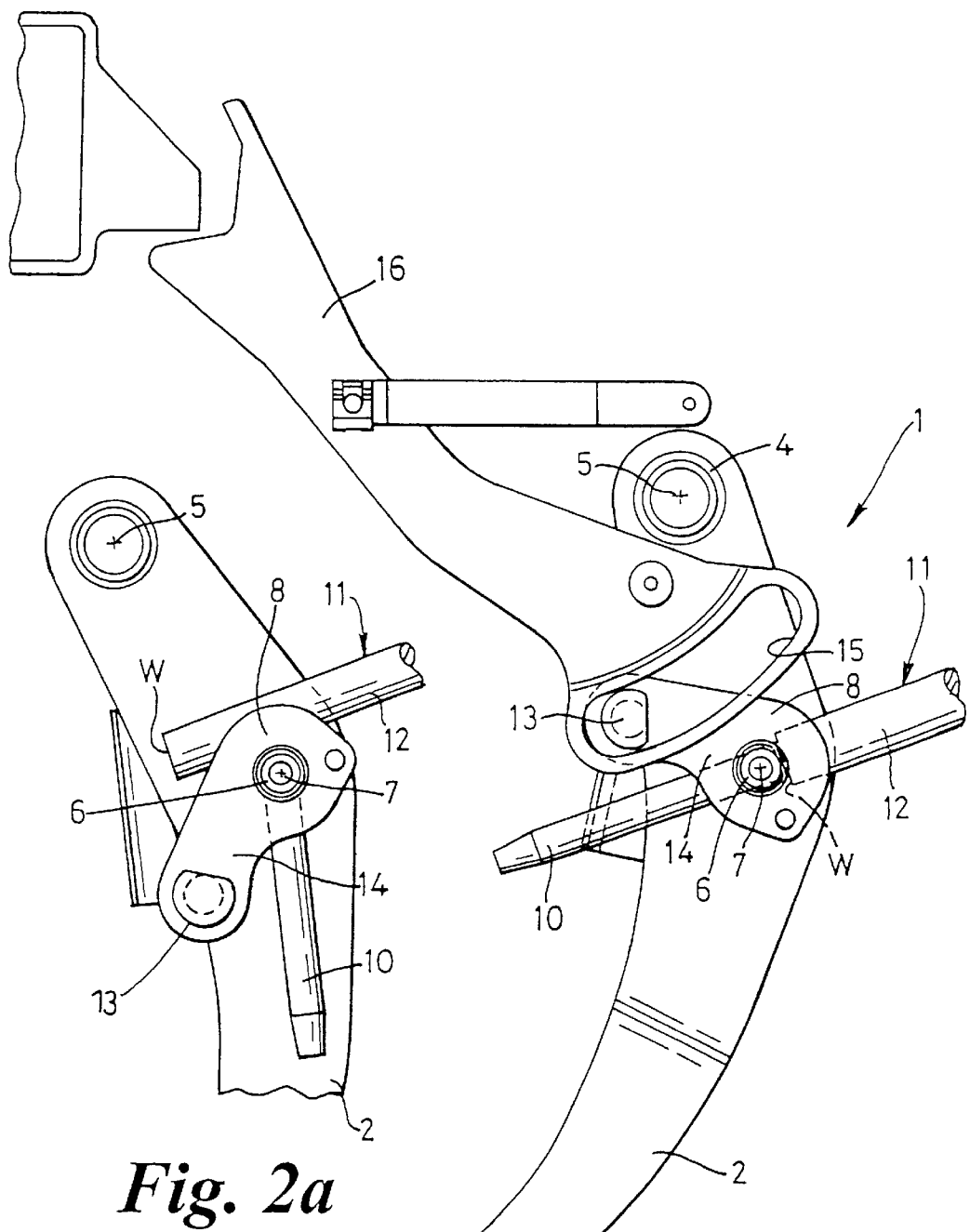
FIG. 2 is a side elevation.
FIG. 2a corresponds to FIG. 2 but shows the positions of the various components in a crash situation.
Figure 3:
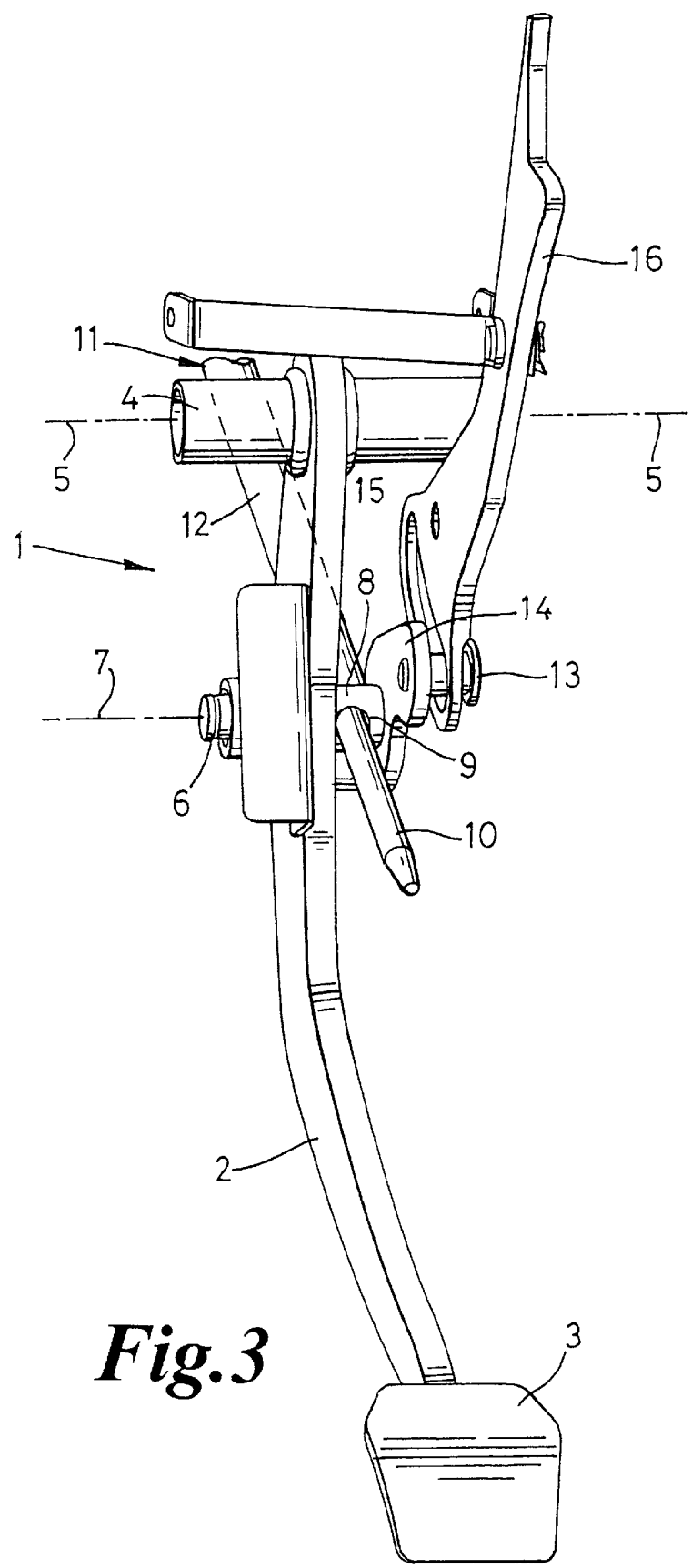
FIG. 3 is a front perspective view to one side.
Figure 4:
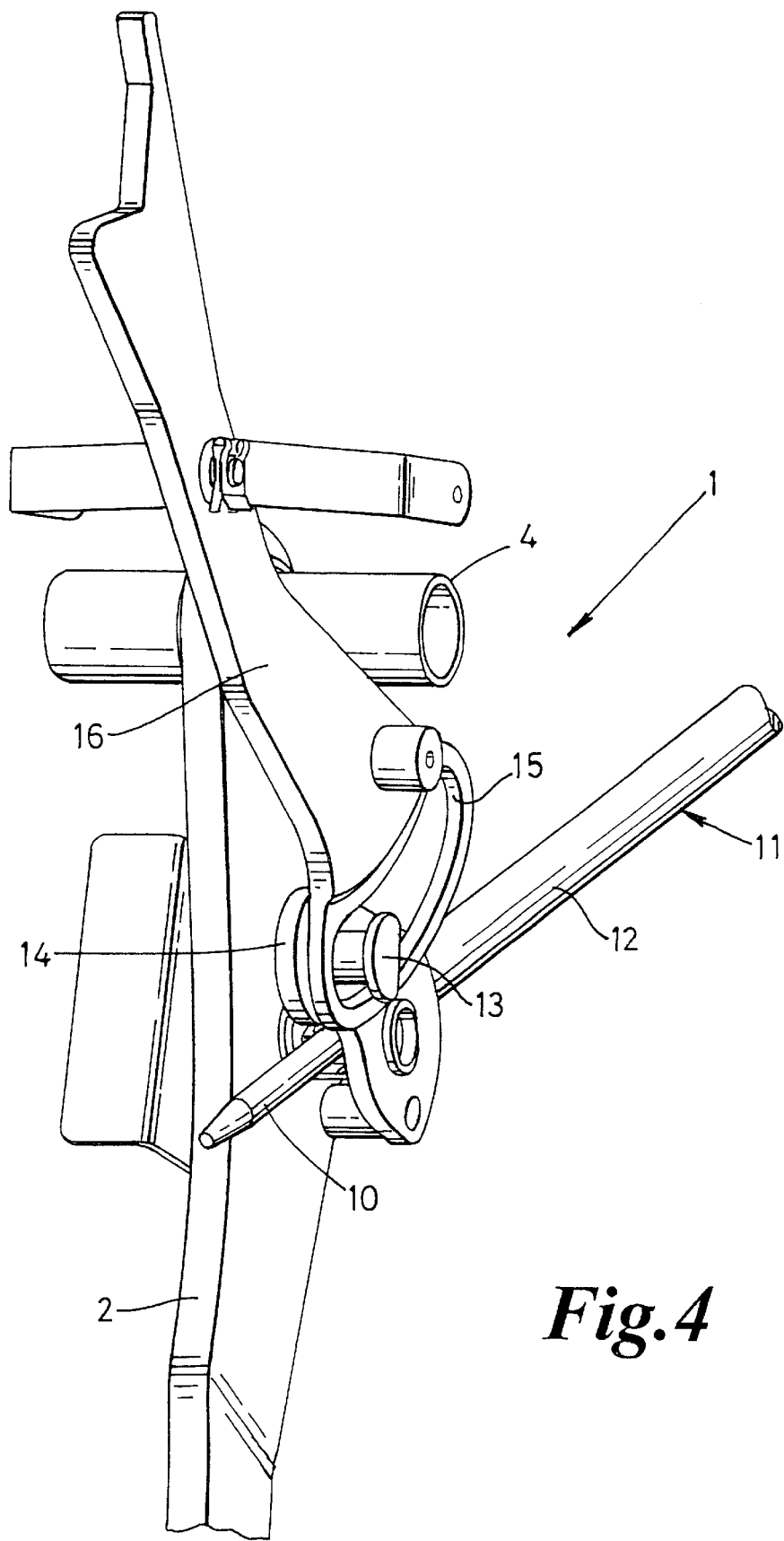
FIG. 4 corresponds to FIG. 3 but is from the other side and to a slightly enlarged scale.

In the drawing is illustrated an arrangement 1 for permitting retraction of a vehicle foot pedal and specifically a brake pedal blade 2, in the event of a vehicle in which the arrangement 1 is installed, being engaged in a frontal crash situation of sufficient magnitude.

The blade 2 is provided at one end with a foot pad 3 and is attached at its other end to a transverse tube 4 rotatably mounted on a pivot pin (not shown) supported across side walls of a pedal box (not shown) for pivotal movement about axis 5.

Intermediate its ends, the blade 2 carries a rotary member 6 which is freely rotatable about an axis 7. The rotary member 6 has a through hole 9 such that a reduced diameter length 10 of a reciprocable brake booster push rod 1 may pass through the hole 9, but a larger diameter length 12 may not, the change of diameter providing a zone of weakness W.

A headed pin 13 projects laterally from one side of a radius arm 14 connected to the rotary member 6 and engages an arcuate slot 15 in an element 16 that is normally in a fixed position, but is displaceable upon a frontal impact of sufficient magnitude. The length of the slot 15 is such that, in a non-crash situation the slot 15 has no effect on the normal pivotal movement of the blade 2, and reciprocal movement of the push rod 11.

However, upon a frontal crash situation producing sufficient deformation, the headed pin 13 firstly engages one end of the slot 15 and upon continued definition the element 16 rotates the rotary member 6 via the radius arm 14, until the brake booster rod 11 snaps at its zone of weakness W, which is its point of transition between reduced diameter portion 10 and larger diameter portion 11, thereby disconnecting the blade 2 from the brake booster, so that the blade is free to rotate away from the feet, or lower legs, of the driver.

I claim:

1. An arrangement for disconnecting a pivotally mounted motor vehicle foot pedal operable on a push rod, in a frontal crash of sufficient magnitude, said arrangement being characterised in that:
   (i) said push rod is of low ductability material, and has a zone of weakness;
   (ii) said foot pedal comprises a blade provided with a pivot on which pivot a rotary member is freely rotatable, and via which rotary member of said blade is operationally coupled to said push rod; and
   (iii) activation arm engageable with the conventionally provided cross beam of a motor vehicle upon occurrence of a frontal impact of sufficient magnitude, said activation arm serving to initiate said disconnection, by causing partial rotation of said rotary member to apply a bending moment to said push rod to snap said push rod at said zone of weakness, thereby totally disconnecting said push rod from said blade.

2. An arrangement as claimed in claim 1, wherein said push rod comprises a main length of a first diameter, and an integral, second length of reduced diameter, with said zone of weakness provided at the transition between said two diameters.

3. An arrangement as claimed in claim 2, wherein said rotary member has a through hole through which said reduced diameter length of said push rod passes.

4. An arrangement as claimed in claim 3, wherein said through hole of said rotary member is a circular hole.

5. A motor vehicle comprising an arrangement for disconnecting a vehicle foot pedal operable on a push rod, in a frontal crash of sufficient magnitude, said arrangement being characterised in that:
   (i) said push rod is of low ductability material, and has a zone of weakness;
   (ii) said foot pedal comprises a blade provided with a pivot on which pivot a rotary member is freely rotatable and via which rotary member said blade is operationally coupled to said push rod; and
   (iii) activation arm to initiate disconnection upon occurrence of a frontal impact of sufficient magnitude, said activation arm engaging the conventionally provided cross beam of a motor vehicle and causing partial rotation of said rotary member to apply a bending moment to said push rod to snap said push rod at said zone of weakness, thereby totally disconnecting said push rod from said blade.

* * * * *